UNITED STATES PATENT OFFICE.

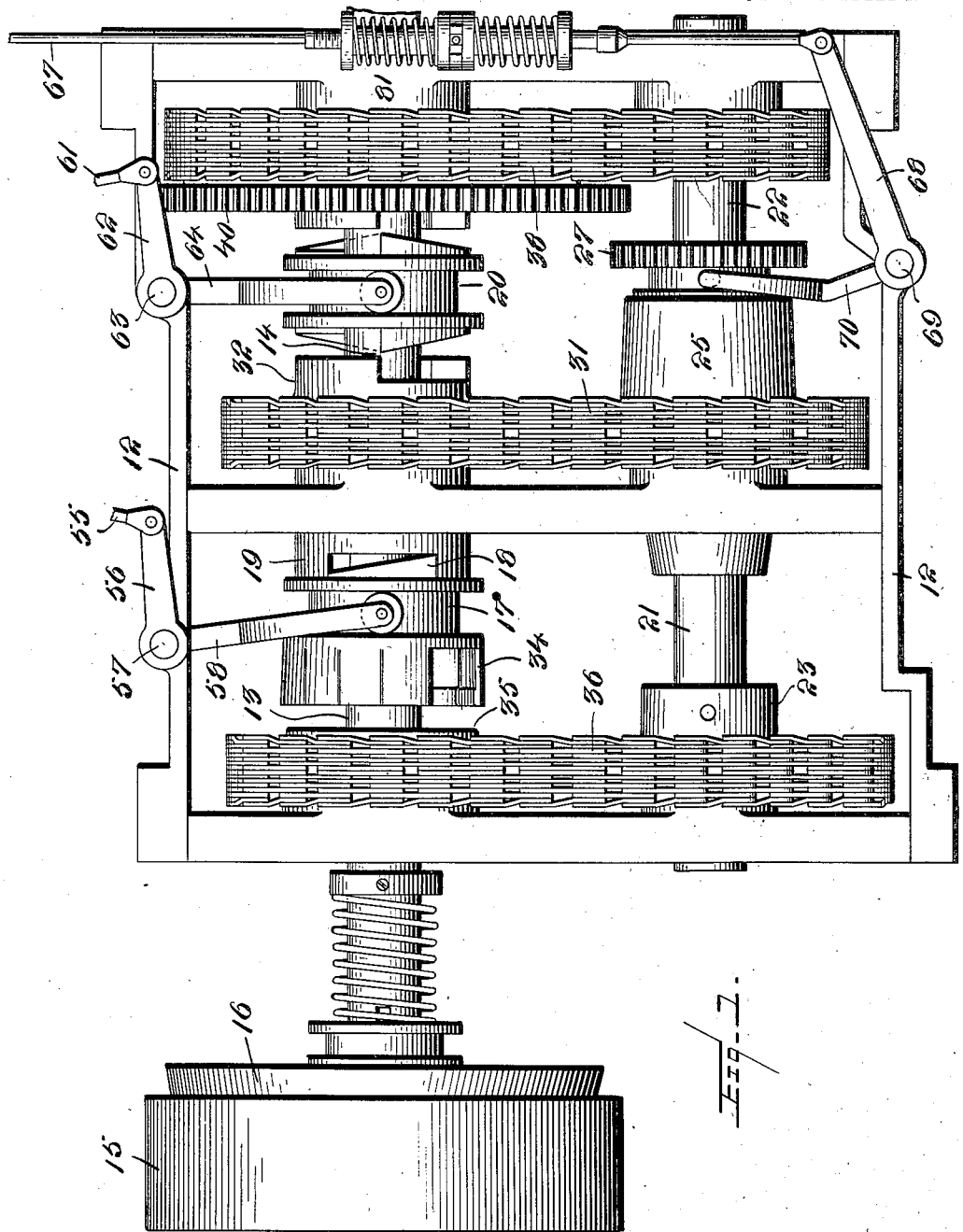

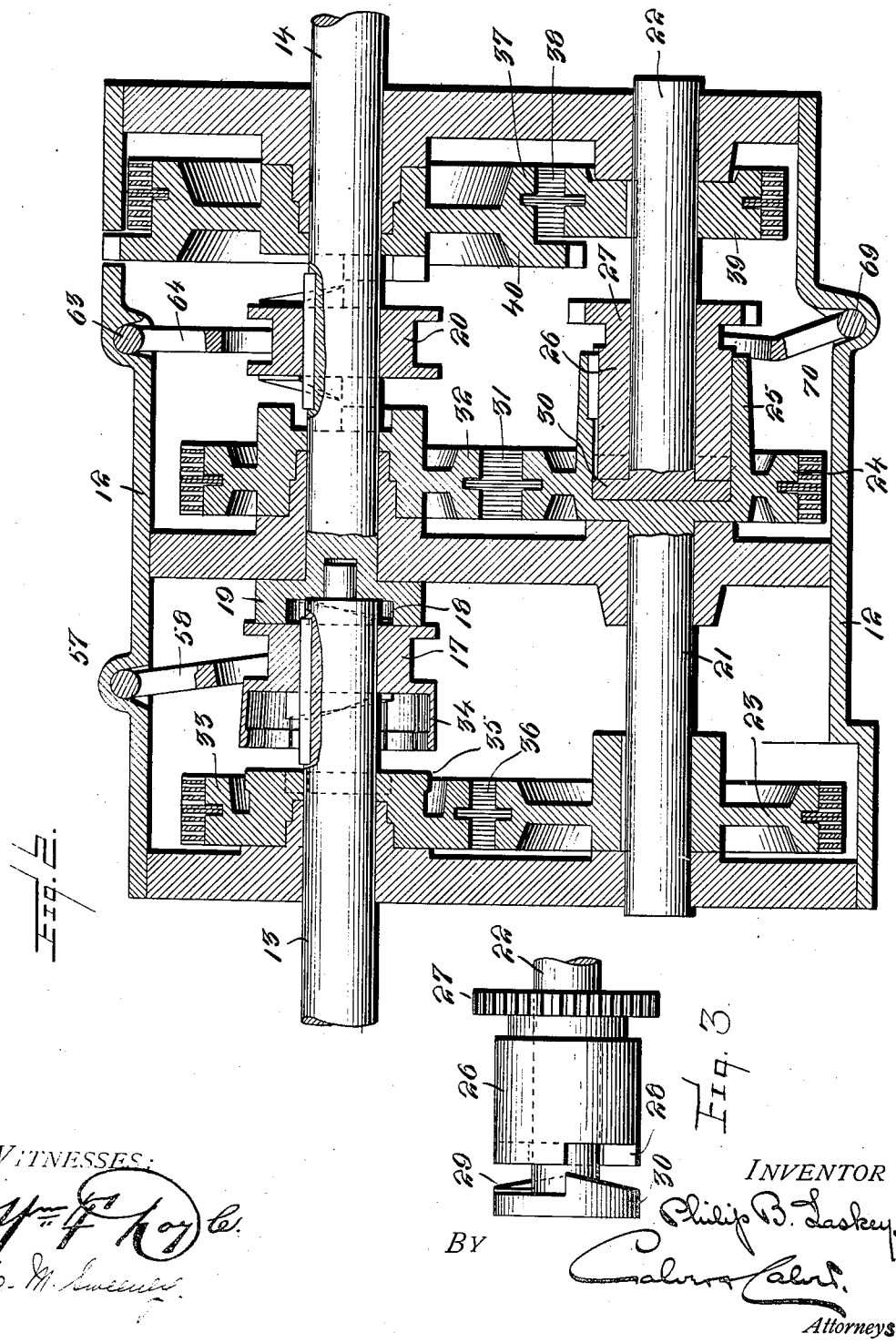

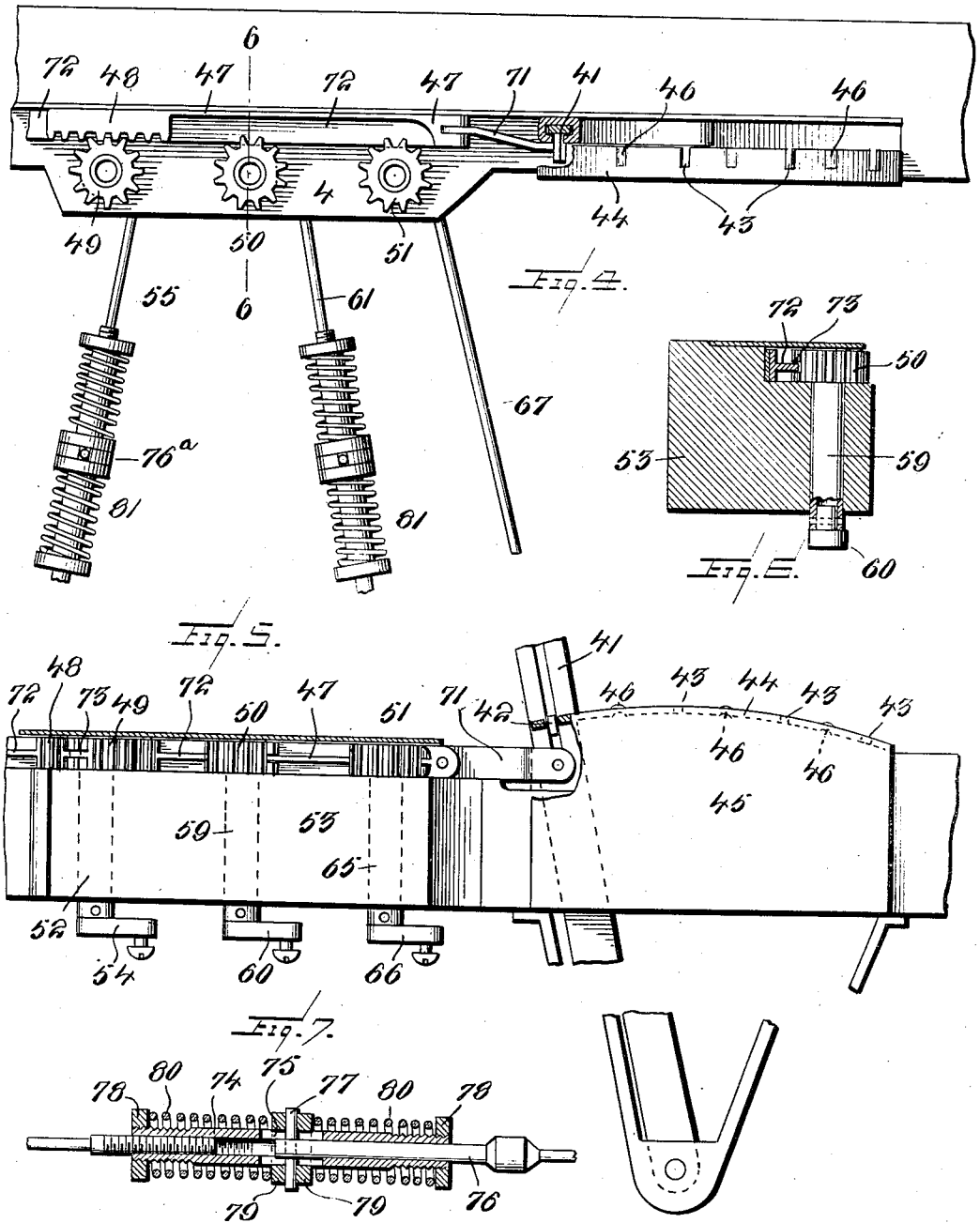

PHILIP B. LASKEY, OF MARBLEHEAD, MASSACHUSETTS.

POWER-TRANSMITTING DEVICE.

1,086,674.  Specification of Letters Patent.  Patented Feb. 10, 1914.

Application filed June 8, 1909. Serial No. 500,853.

*To all whom it may concern:*

Be it known that I, PHILIP B. LASKEY, a citizen of the United States, residing at Marblehead, in the county of Essex and State of Massachusetts, have invented or discovered certain new and useful Improvements in Power-Transmitting Devices, of which the following is a specification, reference being had therein to the accompanying drawings.

This invention relates to a power transmitting mechanism more especially adapted for use with motor vehicles but which may also be used for other purposes, if desired, and the invention has for its object to provide a variable speed transmission mechanism in which the high-speed position of the parts will permit a direct connection of the driven shaft with the driving shaft, and in which the construction and arrangement of the parts are such as to provide for a silent multiple speed forward drive and a reverse drive by a comparatively simple mechanism which will require only one counter-shaft, as also to provide a controlling mechanism by which the gearing for producing different speeds and directions of drive may be controlled by a single movement in one direction of a single controlling lever. In the present improved power-transmitting mechanism when the direct high-speed driving parts are in operation the gearing for the reduced speed drives and for the reverse drive are at rest, although still connected or geared for operation, and as these gearing parts are at rest during the operation of the high speed driving mechanism all friction and noise which might otherwise result from an idle movement of these parts is avoided. This is particularly advantageous in that in the operation of most motor vehicles the high speed driving mechanism is in operation during most of the time and the reduced speed and reverse drive gearing mechanisms are brought into use comparatively infrequently, or for comparatively short times. Also the present improved power transmitting mechanism is of such construction and is so connected with the controlling lever that when the lever is moved to a position for the purpose of effecting a change in speed such movement may be quickly made and the lever released by the driver before the parts have been moved to effect the change in gearing, the movement of the clutching device being effected, subsequent to the movements of the controlling lever, through the medium of spring-connections which after the controlling lever has been moved to its new position will automatically effect the clutching operations.

Other objects of my invention, together with means whereby the same may be carried into effect, will best be understood from the following description of one form or embodiment thereof illustrated in the accompanying drawings. It is to be understood, however, that the construction shown and described has been chosen for illustrative purposes merely, and that many other embodiments thereof may be adopted without departing from the spirit and scope thereof.

In said drawings:—Figure 1 is a plan view of a transmission mechanism constructed in accordance with my invention. Fig. 2 is a horizontal section of the parts shown in Fig. 1. Fig. 3 is a detail plan view of a movable clutch device hereinafter referred to. Fig. 4 is a plan view of the controlling mechanism. Fig. 5 is an elevation of the parts shown in Fig. 4. Fig. 6 is a sectional view taken substantially on the line 6—6, Fig. 4. Fig. 7 is a longitudinal section of one of the yielding connections hereinafter referred to.

I have chosen for illustration and description herein mechanism constructed and arranged to provide for a forward drive of three speeds, herein referred to as the high speed, the intermediate speed, and the low speed, respectively, and a reverse drive.

Referring to the drawings, 12 denotes a portion of a gear case or frame which may be of any suitable construction, and which provides bearings for a preferably two-part main shaft comprising the power shaft 13 and the driven shaft 14 which is in alinement with the power shaft and which will be connected in any suitable manner with the driving wheels of the vehicle or any other part or machine to be driven. Any suitable driving means or rotating actuator for the mechanism may be employed. In the construction herein shown 15 denotes a pulley which is loosely mounted on the power shaft 13 and which is connected with the said power shaft through the medium of a friction clutch wheel 16 the hub of which is splined to the said power shaft and which is controlled as to its clutching and unclutching operation in any suitable manner as is usual in devices of this kind, so that when the said clutch wheel is in driving engagement with the said pulley the power shaft 13 and the driven shaft 14, when connected therewith, will be in operation.

Slidingly mounted on the power shaft 13 is a double acting or two-faced clutching hub 17 having on one face suitable clutch projections 18 for engagement with similar clutch projections on a hub 19 preferably formed integral with the driven shaft 14 for the purpose of directly connecting the said driven shaft to the power shaft for the high speed drive. Mounted in suitable bearings in the gear case or frame 12 is a counter shaft herein shown as formed in two parts 21 and 22 which are preferably always directly and positively connected by means hereinafter described excepting on the reverse drive. Keyed to the part 21 of the counter shaft, in the form of the invention herein shown, is a sprocket wheel 23, connected by a chain 36 with a coöperating sprocket wheel 33 loose on the power-shaft 13 but capable of being clutched thereto by suitable clutch projections on the hub 17. When the hub 17 is in the position shown in Figs. 1 and 2 the shafts 13 and 14 are directly connected for the high speed drive, the sprocket wheel 33 being at this time unclutched and the counter-shaft inoperative. Movement of the hub 17 to its opposite extreme will result in releasing the shafts 13 and 14 from their direct high speed drive connection and will operatively connect the sprocket wheel 33 and shaft 13, thereby setting into operation the counter shaft through which the shaft 14 is actuated for the intermediate, low speed, and reverse drives.

The sprocket wheel 33 and the clutch hub 17 each have suitable projections for the purpose of forming a grab or positive clutch of ordinary construction, and said clutch hub 17 and sprocket 33 are also preferably provided with means for frictional interengagement prior to their positive engagement, said means as shown comprising a series of spring fingers 34 carried by said hub and adapted for frictional engagement with an annular flange or ridge 35 on the hub of the wheel 33, so that when the clutch hub 17 is to be operatively engaged with the said wheel said spring fingers in passing over the said annular flange or rib will have a frictional engagement therewith so as to start the wheel 33 into rotation frictionally before the positive driving projections on the clutch hub secured on said wheels are engaged, and thereby provide for a gradual starting or setting into motion of the part 21 of the countershaft through the medium of the chain 36 connecting the said sprocket wheel 33 with the sprocket wheel 23. Suitably secured to or formed integral with said shaft part 21 is a second sprocket wheel 24 having a sleeve-like hub portion 25. Said sprocket 24 is connected by a chain 31 to a coöperating sprocket 32 loose on the shaft 14 and adapted to be clutched thereto by a second double-faced clutching hub 20 slidingly mounted on the driven-shaft 14 for rotation therewith. The sprocket wheels 24 and 32 with their chain connection form the intermediate speed driving mechanism, it being obvious that when the sprocket wheels 33 and 32 are clutched to their respective shafts the shaft 14 will be driven from the power shaft 13 through the sprockets 33 and 23, counter-shaft part 21, and sprockets 24 and 32.

Slidingly mounted within the hub portion 25 of the sprocket wheel 24 and splined or otherwise suitably connected thereto is a sleeve or hub 26 provided with an integral or rigidly attached gear wheel 27 whose purpose will be hereinafter described. The hub 26 is provided at its inner end with clutch projections 28 adapted for engagement with similar projections 29 formed on one face of a disk portion 30 preferably integral with the counter shaft part 22 whereby said counter-shaft parts 21 and 22 are directly and positively connected as above stated.

Mounted for rotation independently of the driven shaft 14 but adapted to be clutched thereto by the hub 20 is a sprocket wheel 37 connected by a chain 38 with a smaller sprocket wheel 39 keyed to the part 22 of the counter-shaft. Said sprocket wheels 37 and 39 and connecting chain form the low speed drive, it being obvious that the shaft 14 may be driven from the power shaft 13 through the sprockets 33 and 23, counter-shaft 21, 22, and sprockets 39 and 37.

Preferably secured to or formed integral with the sprocket wheel 37 is a gear wheel 40 arranged for engagement with the gear wheel 27, which, for the reverse drive, will be operatively connected with the part 21 of the counter shaft through the medium of the sleeve 25 which rotates with the shaft 21. When the sliding hub 26, with which the gear wheel 27 is herein shown as being integral, is moved to a position to cause the said gear wheel 27 to register with the gear wheel 40, the said hub will be unclutched from the part 22 of the counter-shaft and this disconnection of the said hub 26 on said shaft 22 will thus permit of the reverse drive.

While the foregoing at present appears to me to be the preferable construction, it is obvious that other means may be employed for operatively connecting the counter-shaft with the shaft 14 through the medium of the chain 38 or the gears 27 and 40.

An important part of the present invention is the controlling mechanism for the transmission gearing which has already been described. A preferred form of such mechanism will now be described, reference being had more particularly to Figs. 4 and 5, which, taken in connection with Fig. 1, show the connection of this mechanism with the parts above described.

Mounted on any suitable fulcrum support is a controlling lever 41 provided with a suitable, preferably spring-pressed, locking dog 42 adapted for engagement with any one of a series of notches 43 formed in the curved flange 44 of a sector plate 45, and between which locking notches 43 on the under side of the said flange are preferably formed slight indentations 46 which will serve, in connection with said spring pressed locking dog 42 to frictionally retain the said controlling lever in neutral or intermediate positions in which the driven shaft and all of the gearing, excepting, in the preferred construction, the gearing connecting the power shaft with the part 21 of the counter shaft, will be at rest as hereinafter more fully described. Connected by a link 71 with the controlling lever 41 is a slide or sliding bar 47 formed with a suitable number of rack teeth constituting a single rack 48 arranged for successive engagement with each of three pinions 49, 50 and 51, so that by moving the said rack bar through the medium of said lever the transmission gearing may be controlled as desired.

The pinion 49 is attached at the upper end of a rock shaft 52 mounted in any suitable frame portion 53 and provided at its lower end with an arm 54 joined by a connecting rod 55 (see Figs. 1 and 4) with an arm 56 on the upper end of a rock shaft 57 provided with a fork 58 for sliding the clutch hub 17 back and forth on the power shaft 13, thus controlling the direct drive between said power shaft 13 and the driven shaft 14, as also the transmission drive between the said power shaft and the counter shaft.

The pinion 50 is mounted in the upper end of a rock shaft 59 provided at its lower end with an arm 60 joined by a connecting rod 61 (see Figs. 1 and 4) with an arm 62 on the upper end of a rock shaft 63 provided with a fork 64 for shifting the clutch hub 20 back and forth in order to engage said clutch hub either with the intermediate speed sprocket wheel 32 or with the low speed sprocket wheel 37 and reverse gear 40.

The pinion 51 is attached at the upper end of the rock shaft 65 provided at its lower end with an arm 66 connected by a connecting rod 67 (Figs. 1 and 4) with an arm 68 of a rock shaft 69 provided at its lower end with a fork 70 engaging the clutch hub 26 for the purpose of controlling the operation of the sprocket wheel 39 for the low speed forward drive and the engagement of the gears 27 and 40 for the reverse drive.

The rack 48 is arranged to engage the pinions 49, 50 and 51 successively, and is preferably of a sufficient length to engage each pinion and move the same through a partial rotation, and thereafter to move out of engagement therewith. After such disengagement of the rack from any of the pinions it is desirable that such pinion be locked against accidental rotation, thereby preventing any improper movement of any of the clutches. To this end the slide 47 and each of the pinions are provided with interengaging parts or surfaces adapted to cause said pinions to be locked in the desired manner, and in the construction shown said slide 47 is provided at either side of the rack 48 with a tongue or edge portion 72 adapted to enter suitably disposed notches 73 formed in one or more of the teeth of each of said pinions, see more particularly Fig. 6. Each of the connecting rods 55, 61, and 67 is preferably provided with a yielding element, designated as a whole in the drawings by the numeral 81, arranged to permit the controlling lever 41 to be moved at any time and to any position irrespective of the relative positions of the various parts of the transmission mechanism, and thereafter released, and to cause a subsequent automatic operation of the clutches when the proper time therefor has been reached. These yielding connections are all substantially similar to one another, and the preferred construction of one of them is shown in detail in Fig. 7. Said device as shown comprises a sleeve 74 provided with a slot or slots 75 and with projections 76ª (see Fig. 4) adjacent said slot or slots, and a rod 76 arranged to move in said sleeve and provided with the pin or projection 77 passing through the slot 75. Adjacent each end of the sleeve 74 is a fixed collar 78, while at either side of the projection 76ª is a movable collar 79, said movable collars being normally held in engagement with said projection 76ª by springs 80 interposed between the collars 78 and 79.

It will be observed that each of the clutch devices 17, 20 and 26 is double acting or movable into two opposite clutching or operative positions between which is an intermediate or inoperative position. The slot 75 of each of said devices 81 is preferably of a length corresponding to the necessary longitudinal movement of the corresponding connecting rod for moving its clutch from one operative position to the other. Referring now to Fig. 7, and assuming the clutch controlled by the device therein shown to be in its intermediate or inoperative position, suppose the rod 76 to be moved to the left. The tension of the left hand spring 80 will be sufficient to cause the engagement of the clutch if the clutch faces are in proper position. If not, said spring will be compressed and the pin 77 moved to the left extremity of the slot 75. Thereafter when the clutch faces arrive in clutching position the spring 80 will expand and the sleeve 74 be moved a distance to the left corresponding to one-half the length of the slot 75, and the parts will again be in the relative position shown in Fig. 7 but moved as a whole a certain distance to the left. Upon the movement of the rod 76 to the right from its last position to return the clutch to its intermediate position, if such clutch becomes caught or fails to be immediately disengaged the pin 77 will be moved to the right hand extremity of the slot 75, and thereafter, if said rod 76 be moved farther to the right to move the clutch into its opposite clutching position, the parts will be positively disengaged. It will therefore be seen that the device 81 provides means whereby the clutches may be engaged yieldingly but positively disengaged if necessary.

The operation of the mechanism as a whole may now be briefly described as follows: In the drawings the parts are shown in the position occupied by them for the direct forward high speed drive, in which condition the lever 41 would be in its extreme forward position with its locking dog engaging the foremost notch 43, the clutch hub 17 in a position to connect the shafts 13 and 14, and the sprocket wheel 33 disengaged from the shaft 13, so that the counter-shaft 21, 22 is idle. If the lever 41 be now moved rearwardly until the dog 42 engages the first depression 46 the pinion 49 will be rotated and the part 58 moved to disengage the clutching projections 18 from the hub 19, and to cause said clutch hub 17 to be brought into clutching engagement with the sprocket wheel 33, thereby bringing the counter-shaft into operation. At this time, however, the hub 20 remains in its central position so that there will be no operative connection between the counter-shaft and the driven shaft 14, and said counter-shaft will run idle. A further movement of the lever 41 to the next notch 43 will produce a rotation of the pinion 50 to cause the clutch hub 20 to engage the sprocket wheel 32 thereby setting the parts for the intermediate speed drive. A further movement of the lever 41 to the next depression 46 will cause a further rotation of the pinion 50, thereby disengaging the hub 20 from the sprocket 13 leaving the driven shaft again disengaged. A further movement of the lever 41 to the third notch 43 will cause a further rotation of the pinion 50 causing the clutch hub 20 to engage the sprocket 37, thereby connecting the parts for the low speed drive. A further movement of the lever 41 to the last depression 46 will cause the pinion 51 to be turned thereby disconnecting the hub 26 from the hub 30, and the driven shaft 14 will be again disengaged from operative connection with the power shaft. A final movement of the lever 41 to the last notch 43 will cause a further rotation of the pinion 51, and a further movement of the hub 26 to cause the engagement of the gears 27 and 40 thereby connecting the driven shaft 14 for the reverse drive. It will now be seen that a single movement in a single direction of the lever 41 is capable of producing successively all of the necessary connections for a high, intermediate and low speed forward drive, and for a reverse drive, and that in moving said lever from one position to another a neutral or intermediate position is in each case assumed in which the driven shaft 14 is entirely disengaged from the power shaft, so that, by manipulation of the lever 41, the mechanism may be quickly stopped at any time irrespective of the speed or direction of drive and may subsequently be started at any speed or in either direction. It will furthermore be seen that said lever 41 can be moved to any position with the mechanism either in motion or at rest, and through one or more intermediate positions, without causing the engagement of the clutches corresponding to said intermediate positions if said clutches are not in the proper relative positions for such engagement, the proper connections 81 yielding to permit such movement. By virtue of this construction the operator is not obliged to wait for the engagement and subsequent disengagement of intermediate gears in shifting from one extreme position to another. For example, the mechanism may be changed from high to low speed without the necessity of engaging the parts for the intermediate speed.

Having thus described my invention I claim and desire to secure by Letters Patent:

1. In a transmission mechanism, in combination, a power shaft, a driven shaft, a single transmission counter-shaft, transmission elements connecting said power shaft and counter-shaft, coöperating, alternatively operative members on said driven shaft and counter-shaft for causing said driven shaft to be driven in either direction, a single device movable into alternative positions for effecting the operative connection of said power shaft with said driven shaft directly and with said counter-shaft through said transmission elements, and mechanism for controlling said device.

2. In a transmission mechanism, in combination, a power shaft, a driven shaft, a single transmission counter-shaft, transmission elements connecting said power shaft and counter-shaft, coöperating members on said driven shaft and counter-shaft for causing said driven shaft to be driven in either direction and at different speeds, a single device movable into alternative positions for effecting the operative connection of said power shaft with said driven shaft directly and with said counter-shaft through said transmission elements, and mechanism for controlling said device.

3. In a transmission mechanism, in combination, a driven shaft, a single counter-shaft, one or more sprockets on each of said shafts, one or more chains connecting said sprockets, intermeshing gears on said shafts, devices for clutching one or more of said sprockets to said driven shaft, for rendering operative or inoperative a sprocket on said counter-shaft, and for engaging and disengaging said gears, and means for controlling said devices.

4. In a transmission mechanism, in combination, a power shaft, a driven shaft, a counter-shaft, a sprocket on said power shaft, a clutch for operatively connecting said sprocket with said shaft, a sprocket on said counter-shaft, a chain connecting said last-named sprocket with said first-named sprocket, a series of additional sprockets on said counter-shaft, chains connecting the opposite sprockets of said series in pairs, clutch devices for operatively connecting one of the sprockets of each pair with its respective shaft, and means for controlling said clutch devices.

5. In a transmission mechanism, in combination, a power shaft, a driven shaft, a counter-shaft, transmission devices connecting said power shaft and counter-shaft, a plurality of devices for driving said driven shaft from said counter-shaft, and a single device movable to opposite positions for alternatively effecting the operative connection of said power shaft with said driven shaft directly and with said counter-shaft through said transmission devices.

6. In a transmission mechanism, a power shaft, a driven shaft, a counter-shaft, transmission devices connecting said power and counter-shaft, a single device movable into alternative positions for effecting the operative connection of said power shaft with said driven shaft directly and with said counter-shaft through said transmission devices, and a plurality of alternatively operative pairs of positive transmission elements on said driven shaft and counter-shaft whereby said driven shaft may be driven from said counter-shaft in either direction.

7. In a transmission mechanism, in combination, a power shaft, a driven shaft in alinement therewith, a counter-shaft, means for operatively connecting said power shaft and counter-shaft, a plurality of alternatively operative positive driving connections directly connecting said counter-shaft and driven shaft, clutches for rendering said connections operative or inoperative, and a clutch for alternatively directly connecting said power shaft with said driven shaft and with said first-named connecting means.

8. In a transmission mechanism, in combination, a power-shaft, a driven shaft in alinement therewith, a counter-shaft, means for driving said counter-shaft from said power shaft, a plurality of alternatively operative devices directly connecting said driven shaft and counter-shaft, and a double acting clutch for alternatively connecting said power shaft with said driven shaft and with said counter-shaft driving means.

9. In a transmission mechanism, in combination, a driven shaft, a counter-shaft, driving connections intermediate said shafts, gears also connecting said shafts, a sleeve by which one of said gears is carried, said sleeve being longitudinally movable with respect to one of said shafts and connected thereto to rotate therewith, and means carried by said sleeve for rendering said connections operative and inoperative.

10. In a transmission mechanism, in combination, a power shaft, a driven shaft, mechanism for driving said driven shaft from said power shaft including devices for alternatively connecting the same to produce a plurality of different drives, a controller movable to a plurality of successive positions for causing said driving mechanism to be connected to produce said different drives respectively, and means for operatively connecting said controller with said connecting devices, said means being constructed and arranged to permit said controller to be moved from one position to another through one or more intermediate positions without causing said driving mechanism to be connected to produce the drive or drives corresponding to said intermediate positions.

11. In a transmission mechanism, in combination, a power shaft, a driven shaft, mechanism intermediate said shafts for producing a plurality of drives of said driven shaft from said power shaft and including one or more clutch devices, a controller, and connections intermediate said controller and clutch devices for yieldingly engaging said clutch devices and positively disengaging the same.

12. In a transmission mechanism, in combination, a power shaft, a driven shaft, mechanism intermediate said shafts for producing a plurality of drives of said driven shaft from said power shaft and including one or more clutch devices, a controller, and connections intermediate said controller and clutch devices each including a yielding element and means for limiting the amount of yield of said element.

13. In a transmission mechanism, in combination, a power shaft, a driven shaft, mechanism intermediate said shafts for producing a plurality of drives of said driven shaft from said power shaft and including one or more double acting clutch devices, a controller, and connections intermediate said controller and clutch devices each constructed to have a limited yielding movement in both directions.

14. In a transmission mechanism, in combination, a power shaft, a driven shaft, mechanism intermediate said shafts for producing a plurality of drives of said driven shaft from said power shaft and including one or more clutch devices, a controller, and connections intermediate said controller and clutch devices each including a slotted sleeve, a rod within said sleeve and having a projection entering the slot thereof, fast and loose collars on said sleeve, and a spring interposed between said collars.

15. In a transmission mechanism, in combination, a power shaft, a driven shaft, mechanism intermediate said shafts for producing a plurality of drives of said driven shaft from said power shaft and including one or more clutch devices, a controller, and connections intermediate said controller and clutch devices each including a slotted sleeve having a projection adjacent the slot, a rod within said sleeve and having a pin entering said slot, collars fast on said sleeve at opposite sides of said projection, collars loose on said sleeve between said fast collars and said projection, and springs interposed between said fast and loose collars.

16. The combination with a transmission mechanism, of controlling mechanism therefor, said controlling mechanism including a plurality of rock shafts, a pinion carried by each of said rock shafts, and a sliding rack constructed and arranged to engage said pinions successively.

17. The combination with a transmission mechanism, of controlling mechanism therefor, said controlling mechanism including a rock shaft, a pinion on said rock-shaft, a slide provided with rack teeth adapted to engage said pinion, said slide and pinion being provided with interengaging surfaces for locking said pinion against rotation when out of engagement with said rack teeth.

18. The combination with a transmission mechanism, of controlling mechanism therefor, said controlling mechanism including a slide having rack teeth formed thereon, a rock shaft, and a pinion on said rock shaft and adapted to be engaged by said rack teeth, said pinion having a notch constructed and arranged to receive the edge of said slide when said pinion and teeth are out of engagement.

In testimony whereof I affix my signature, in presence of two witnesses.

PHILIP B. LASKEY.

Witnesses:
HORACE L. BROUGHTON,
WILLIAM A. BROWN.